(12) United States Patent
Keller

(10) Patent No.: US 8,324,762 B2
(45) Date of Patent: Dec. 4, 2012

(54) MAGNETICALLY PROPELLED ENGINE WITH MAGNETIC FIELD REDUCTION

(76) Inventor: Christian Harvey Keller, Leesburg, NJ (US)

( * ) Notice: Subject to any disclaimer, the term of this patent is extended or adjusted under 35 U.S.C. 154(b) by 399 days.

(21) Appl. No.: 12/624,352

(22) Filed: Nov. 23, 2009

(65) Prior Publication Data

US 2010/0066181 A1  Mar. 18, 2010

Related U.S. Application Data

(60) Provisional application No. 61/193,372, filed on Nov. 21, 2008.

(51) Int. Cl.
H02K 7/075 (2006.01)

(52) U.S. Cl. .......................... 310/20; 310/46

(58) Field of Classification Search ............ 310/20, 310/30, 34, 35, 37, 46, 12.14, 49.48, 152
See application file for complete search history.

(56) References Cited

U.S. PATENT DOCUMENTS

| | | | | |
|---|---|---|---|---|
| 788,291 A * | 4/1905 | Tizel, Sr. | ................. | 310/46 |
| 4,156,817 A * | 5/1979 | Preece et al. | ................. | 290/38 R |
| 4,317,058 A * | 2/1982 | Blalock | ................. | 310/24 |
| 4,450,373 A * | 5/1984 | Miller et al. | ................. | 310/51 |
| 4,532,901 A * | 8/1985 | Sturdy | ................. | 123/333 |
| 4,631,455 A * | 12/1986 | Taishoff | ................. | 318/37 |
| 5,219,034 A * | 6/1993 | Wortham | ................. | 180/65.31 |
| 5,233,251 A * | 8/1993 | Nehmer | ................. | 310/167 |
| 5,457,349 A * | 10/1995 | Gifford | ................. | 310/24 |
| 5,592,036 A * | 1/1997 | Pino | ................. | 310/24 |
| 5,595,801 A * | 1/1997 | Fahy et al. | ................. | 428/40.1 |
| 5,757,093 A * | 5/1998 | Susliaev et al. | ................. | 310/24 |
| 5,996,209 A * | 12/1999 | Molnar et al. | ................. | 29/596 |
| 6,414,406 B1 * | 7/2002 | Ikoma et al. | ................. | 310/30 |
| 6,713,933 B2 * | 3/2004 | Martin | ................. | 310/254.1 |
| 7,105,958 B1 * | 9/2006 | Elmaleh | ................. | 310/24 |
| 7,330,094 B2 * | 2/2008 | McCarthy et al. | ................. | 335/306 |
| 7,501,725 B2 * | 3/2009 | Parker | ................. | 310/24 |
| 7,629,713 B2 * | 12/2009 | Beaulieu | ................. | 310/323.01 |
| 7,893,570 B2 * | 2/2011 | Redinbo | ................. | 310/24 |
| 2005/0127767 A1 * | 6/2005 | Gallant | ................. | 310/113 |
| 2005/0184613 A1 * | 8/2005 | Minato et al. | ................. | 310/178 |
| 2008/0122299 A1 * | 5/2008 | Cristoforo et al. | ................. | 310/20 |

* cited by examiner

Primary Examiner — Hanh Nguyen
Assistant Examiner — Naishadh Desai
(74) Attorney, Agent, or Firm — John F. Letchford; Archer & Greiner, P.C.

(57) ABSTRACT

An engine powering device with magnetic components that aid in the operation of piston propelled engines by attaching the device individually to the pistons, causing the pistons to perform the up and down thrusts without the use of fuel combustion thereby mobilizing the engine, eliminating the necessity of fuel and preventing pollution exhausting into the atmosphere. An exemplary system for a magnetically controlled propelled engine that uses exhausted clean air from the engine that flows through an electric generating turbo or turbine to charge the battery to power the engine. Passenger compartment comfort heating is supplied by and electric liquid boiler or liquid heater with a circulation pump. A fuel door mounted universal electrical connector to aid in charging engine battery. This engine has magnetic shielding safety components to protect people and other electronic devices from strong rare earth magnets and electromagnets.

32 Claims, 15 Drawing Sheets

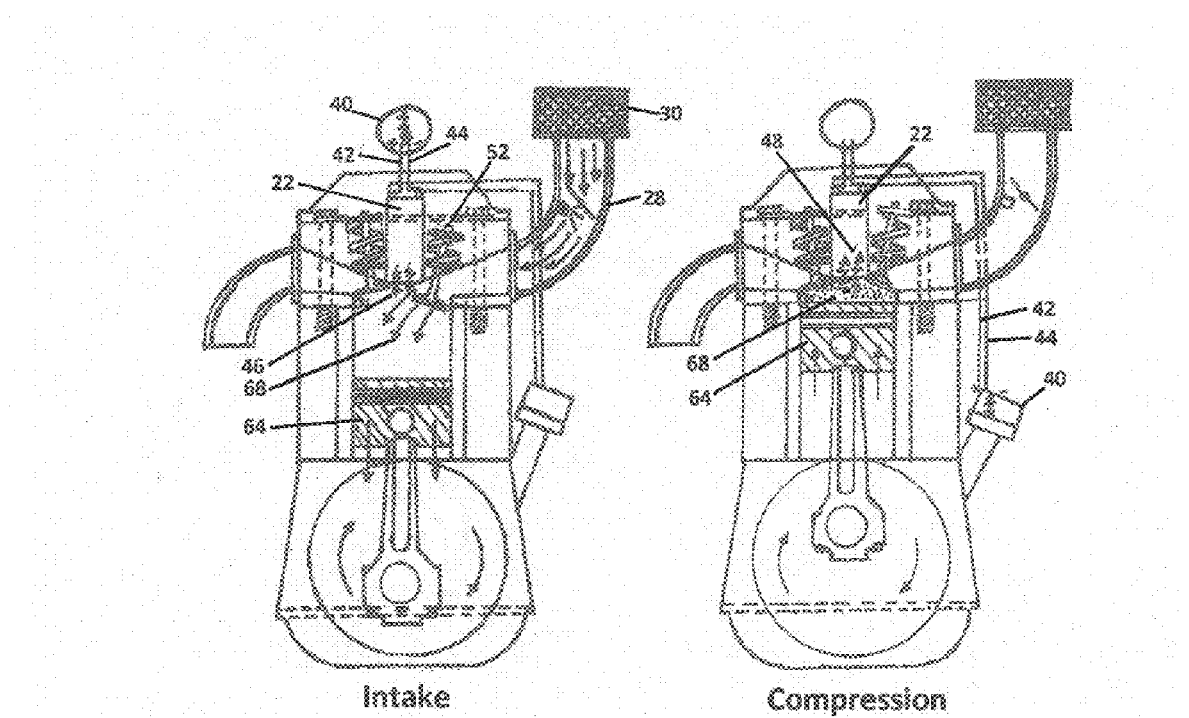
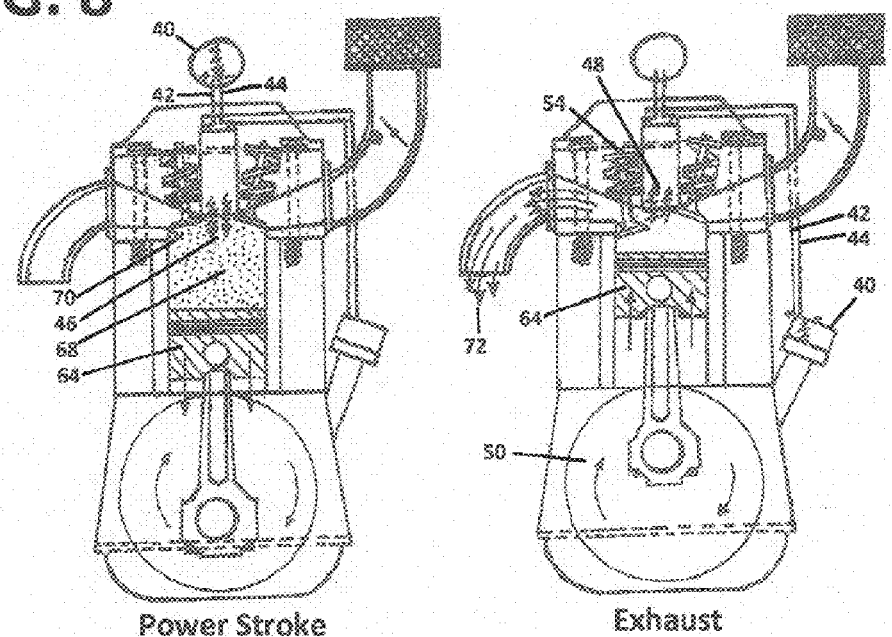
FIG. 8

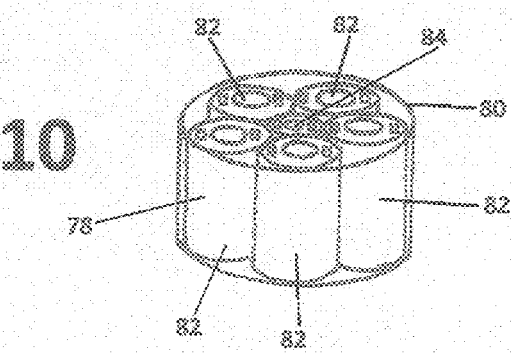
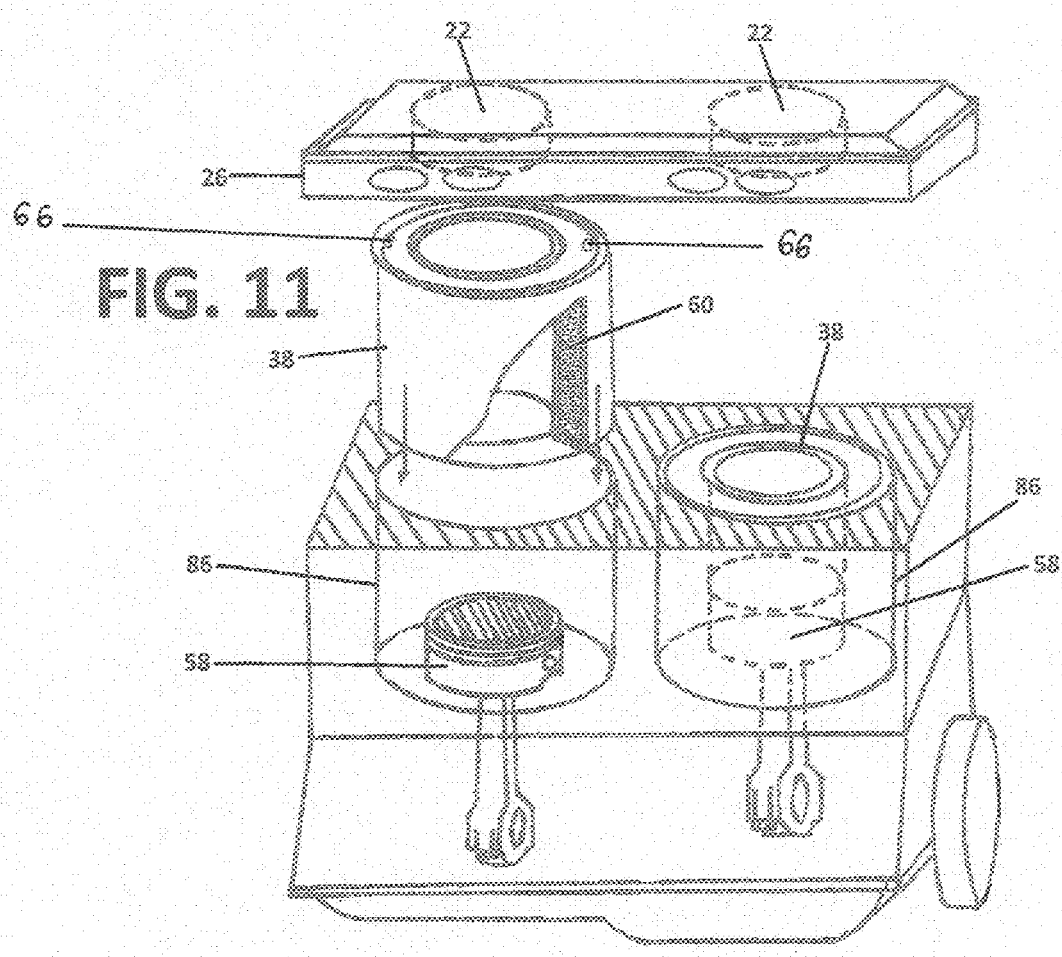

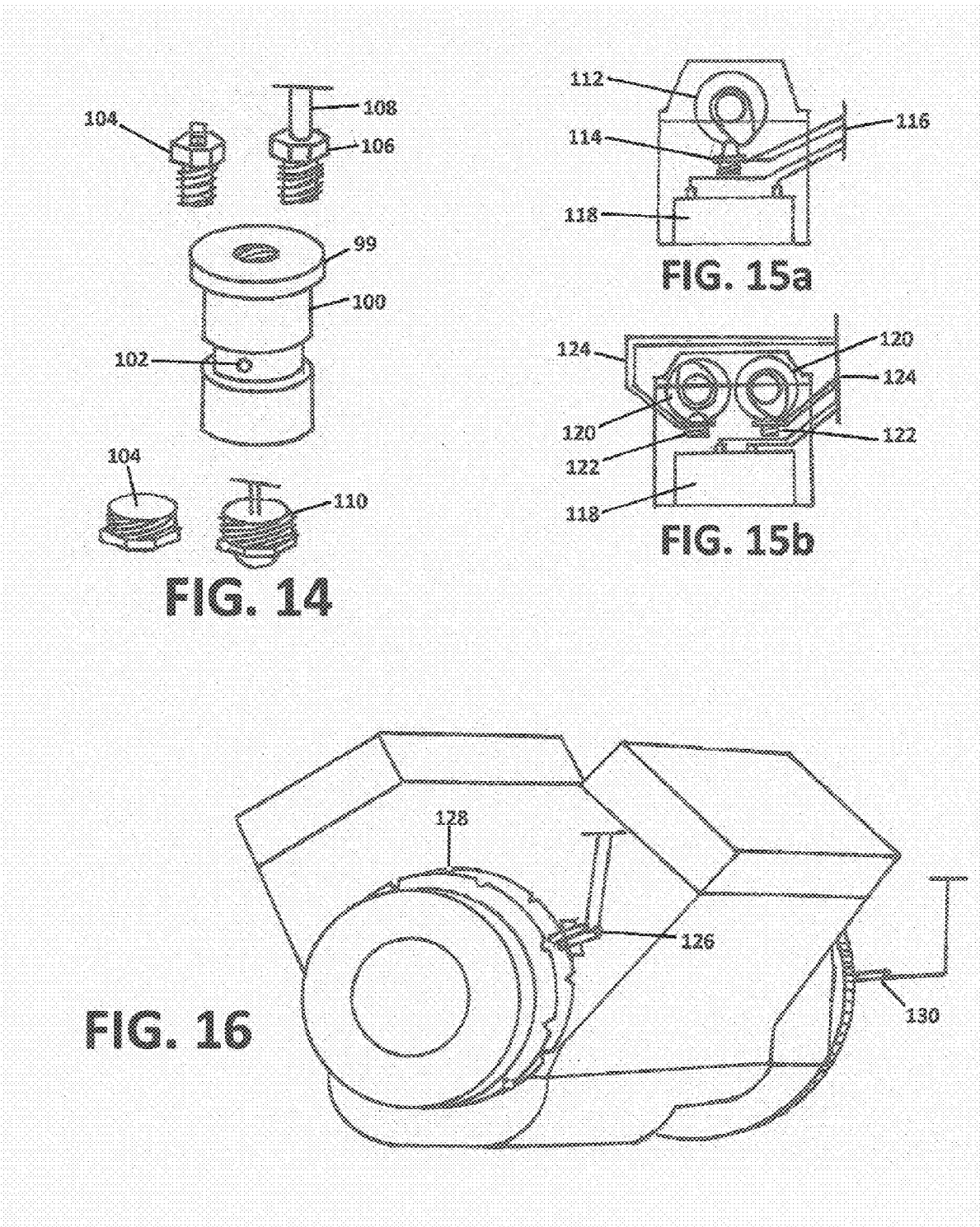

MAGNETICALLY PROPELLED ENGINE WITH MAGNETIC FIELD REDUCTION

FIELD OF THE INVENTION

This invention relates to a magnetic device, computer controlled to time the piston thrusts on most types of engines, eliminating fuel use, friction, engine heat and exhaust fumes thereby extending the life of the engine, with an exhaust powered charging apparatus that doesn't restrict horsepower, liquid heater with circulating pump for the comfort of heat for passenger(s), universal fuel door charging connector and passenger safety by the way of magnetic shielding.

BACKGROUND OF THE INVENTION

Most piston powered engines are spoken of as four-cycle engines. This is a shortening of the correct name, four-stroke cycle. A stroke is one complete down or one complete up movement of the piston. There are two down strokes and two upstrokes to a cycle for the internal combustion engine of this design. A cycle is a round of events, which occurs in a certain fixed order.

There are four events in this engine cycle. These four events correspond to the four strokes. Thus we have the name, the four-stroke cycle, or the shortened and more used term, the four-cycle engine.

On the first stroke of any cycle within an engine, the first event or operation is the drawing in of air and fuel through the carburetor. This occurs on the down stroke of the piston. The second operation is compressing or squeezing together of the fuel charge drawn in on the first down stroke. The compressing of the fuel occurs on the first upstroke of the piston. The fuel is fired at the end of this stroke, and the third event or operation is under way. The piston is forced downward on the second down stroke. On the second upstroke, it drives the burned gases before it, and they pass out of the cylinder. The order, then, of the four strokes of the cycle is this: First down stroke, intake; first upstroke, compression; second down stroke, power; second upstroke, exhaust. The cycles occur as follows: Intake, compression, power, exhaust, again and again. Pistons are moved up and down on the strokes by the crankshaft throw. Each revolution of the crankshaft gives two strokes of the piston. For four strokes (two down, two up) the crankshaft must turn twice. The flywheel, attached as it is to the crankshaft, turns through two complete revolutions for each four strokes of the piston. This magnetically propelled engine magnetically moves the engine's piston(s) in both upward and downward directions creating power throughout the entire range of piston travel, in such a manner to apply constant torque to the engine crank shaft. Unlike a standard 4 cycle internal combustion engine that needs 2 full revolutions to create power on one downward power stroke. This invention creates power the entire length of a piston stroke on every downward and upward stroke of a piston on every revolution. While also having a simple design with less moving parts than an internal combustion engine and runs on electrical power that doesn't require any fuel to run the magnetically powered engine. With the ability to run off of a rechargeable battery(s) and be recharged at home, work or anywhere an outlet may be convenient. The only emission is air from the magnetically propelled engine. It will not emit pollutants into the environment, like the internal combustion engine with the ever tightening pollution restrictions. This air can be used to drive an electric generating turbine or turbo, to create electrical power for the engine to run, and for charging the battery(s). The elimination of combustion also eliminates the extreme heat created from the internal combustion engine and can eliminate the need for a liquid cooling system. The elimination of emissions prevents harsh chemical contaminate residue left behind after combustion from entering the oil that eventually reduces engine oil life. This will give the ability to go longer between oil changes increasing oil life. Cooler operation of my type of engine and longer life between oil changes without the harsh chemical residue, can significantly increase the engine(s) overall life. My magnetic propelled engine has the ability for easy upgrades to make an electro magnet repulsive attractive engine produce more power, by easily upgrading to a larger and more powerful electro-magnet(s).

One attempt at creating battery charging efficiency is disclosed in U.S Pat. Pub. No.: US 2007/0151241 inventor Steven Don Arnold, but does not pertain to a Magnetically Propelled Engine only an internal combustion engine. My electric generating turbo or turbine is specifically for Magnetically Propelled Engines to increase efficiency of the engine by utilizing wasted clean exhaust air to generate electricity without restricting horsepower, by not being powered from the engine crankshaft and being a self contained unit with the ability to have placement anywhere on engine or vehicle.

The other attempt at creating battery charging ability is disclosed in U.S. Pat. No. 5,219,034 inventor Charles Wortham has alternating current generated at the rear axle of the vehicle by the means of an alternating current generator. This kind of electrical power generation is the same used in today vehicles that are powered off of the engine crankshaft, his is the rear axle generator that still uses horsepower generated by an engine to generate electricity and if the vehicle is sitting still it is not generating electrical power making it inefficient compared to my electric generating turbo or turbine that generates power the entire time the engine is running, designed specifically for Magnetically Controlled Propelled Engines to increase efficiency of the engine by utilizing wasted clean exhaust air to generate electricity without restricting horsepower, by not being powered from the engine crankshaft and being a self contained unit with the ability to have placement anywhere on engine or vehicle. Lack of computer control in Charles Wortham Patent decreases the ability to control every fraction of movement in a vehicle with magnetic engine making the engine a very inefficient magnetically propelled engine.

U.S. Pat. No. 1,436,245 issued to Kurt M. Geisler was ingenious for the era it was issued. By today's standard it is a very inefficient engine for the type electromagnets used and the contact switching used to activate the electromagnet. The type of sensors available today to sense crankshaft position, camshaft position and the use of computers today for precise control make the most efficient engine by controlling every fraction of movement in my engine.

U.S. Pat. No. 4,317,058 issued to Sherman S. Blalock invention cylinders are constructed of a non-ferromagnetic material and provided water cooling jackets. The pistons are constructed of a permanent magnet or piston sleeves for carrying a permanent magnet therein. An electro magnet is secured to the outer end of each cylinder. These electro magnets are in the form of cylindrical coils having an axial passageway there-through which serves as a compression relief port to eliminate pressure within the cylinder when the piston is moving outwardly and to eliminate any vacuum created by the piston moving inwardly within the cylinder. The use of non-ferromagnetic does not reduce the amount of magnetic fields created so the maximum amount of ferromagnetic material should be used in an engine block i.e. cast iron for magnetic shielding to protect persons with pacemakers, other on the person electrical equipment and anything else sensitive to magnetic fields. Without combustion the engine will have a lower operating temperature and won't require water cooling jackets. My invention uses the strongest magnets available, which are rare earth magnets, mounted on the piston, molded by being cast or forged, the entire piston cast or forged as a rare earth magnet. Rare earth magnets have higher working temperatures Samarium Cobalt 250-350 Celsius, Neodymium 80-200 Celsius, Alnico 800 Celsius. Rare earth magnets work best because of their resistance to the hysteresis loop. The axial passageway that serves as a compression relief port would not function at all. Sherman S. Blalock invention would Hydro lock or use a lot of electrical energy to just rotate the engine to fight the compression built up during engine rotation even with an axial passageway. The size of the axial passageway would have to be almost half or more than half the size of the piston to allow the engine air to freely flow, which would reduce the size of the outward electromagnet size to the point of being a very inefficient engine and increase engine air noise because of the air traveling through the axial passageway at higher engine speeds.

U.S. Pat. No. 4,510,420 issued to Bill J. Sasso uses a modified cylinder head that has water flowing through the electromagnet coils. This invention uses two rows of electromagnet coil per cylinder. The ferromagnetic plunger which is placed in the cylinders need not fit snugly to maintain compression seal. Rather, it should fit snugly only to the extent necessary to prevent splash of lubrication oil. The design of these coils could draw up to 400 amps and the average house today has a 200 amp service. The use of water flowing through the electromagnet coils could short out having premature failure due to engine operation, corrosion and stress on electromagnet coils. That failure could short out the entire engine's electrical system and with that kind of amperage up to 400 amps could start an electrical fire not easily extinguished. The electromagnet cylinder sleeve(s) in my invention is completely self-contained, easily installed and removed if there is a failure of an electromagnet cylinder sleeve. My electromagnet cylinder sleeve has one or more rows of coils to control the slightest fraction of movement in the piston upward or downward. The piston or ferromagnetic plunger should have the typical three rows of oil rings. One of each of the above ring types, 'top', 'second', and 'oil ring' is usually installed on each piston in a typical engine. Each of the three rings in a set is a 'specialist' and will use a distinct combination of shapes, materials, heat treatment and/or surface coatings in order to perform its assigned function in an optimal way. Looking more closely at the top and second rings, an observant person notices immediately that there are open joints in the periphery of these rings. That is, they are not closed circles. Such a person would also notice something like a spring in the middle of the oil ring. In fact, this 'expander' section does behave like a spring, generating a uniform tension in the oil ring so as to keep it forced tightly against the cylinder wall. The top and second rings are compression rings. The problem of oil splash or blowby will be created without the lack of compression and engine crankcase pressure build up while the engine is running. The compression in the cylinder equalizes the crankcase pressure and keeps the engine oil below the compression rings or more piston rings will have to be added to create a tighter tolerance to keep the engine oil splash or blowby from getting past the rings and being exhausted into the atmosphere.

U.S. Pat. No. 5,457,349 issued to Leland W. Gifford has sequentially energized electromagnets which are mounted in the cylinder walls. The electromagnets are mounted in radially oriented rows and strokewise outwardly extending layers adjacent to cylinder walls. Failure of one radially oriented row will slightly decrease engine horsepower and would be tolerable under normal operating conditions. The loss of a few radially oriented rows or the entire cylinder of radially oriented rows would be terminal for the engine. Because the radially oriented rows are mounted in the cylinder walls and the cylinder bore having to be flawless to prevent piston premature wear may make it impossible to repair at all and most likely repair impossible in a vehicle. The entire engine could become junk if the electromagnets fail or break apart in the cylinder destroying the entire cylinder, cylinder head and piston. My Magnetically Controlled Propelled Engine employs a self contained electromagnet cylinder sleeve that is pressed in the engine block or held tight by the cylinder head. Failure of one electromagnet cylinder sleeve is a simple repair that any mechanic or at home do it yourselfer can do. Increasing engine power is easy to do by just changing the electromagnet cylinder sleeve(s) to a more powerful electromagnet cylinder sleeve(s).

SUMMARY OF THE INVENTION

Although others have invented magnetically driven engines and internal combustion engines, my invention is superior because it converts any internal combustion engine to a magnetically driven engine and engine designers can create new engines employing these magnetic repulsion attraction components and is more versatile by covering all internal combustion engine applications, plus more. Examples this wide range of applications would include are: cars, trucks, tractor trailers, trains, ships, boats, power plants, home electrical generators, other types of electrical generators, farm and lawn equipment, industrial equipment, earth moving equipment, etc. This engine magnetically moves the engine's piston(s) in both inward toward crankshaft and outward directions toward cylinder head. It can employ a simple design with less moving parts than an internal combustion engine. It can run off of a rechargeable battery(s) and be recharged at home; work or anywhere an outlet may be convenient and doesn't require any fuel to run the magnetically powered engine. The only emission is clean air from the magnetically propelled engine. It will not emit pollutants into the environment, like the internal combustion engine. This wasted air can be used to drive an electric turbine or turbo, to create electrical power for the engine to run, and for charging the battery(s) while not taking any horsepower away from the engine.

The elimination of the extreme heat created from the internal combustion engine and can eliminate the need for a liquid cooling system. This could create a wider range of uses for an oil-less engine with plastic or Teflon piston rings. It will operate a lot cooler than an internal combustion engine and won't contaminate the oil with the harsh chemical residue left behind after combustion, which eventually reduces engine oil life. This gives the ability to go longer between oil changes increasing oil life. Cooler operation of my type of engine and longer life between oil changes without the harsh chemical residue, can significantly increase the engine(s) overall life.

A new type of hybrid engine made with internal combustion engine components and my magnetically controlled propelled engine components, which will consume less fuel by deriving more power from the electro-magnet(s) through magnetic repulsion and attraction. Be able to perform easy performance upgrades to make an electro magnet repulsive engine produce more power, by easily upgrading to a larger and more powerful electro-magnet(s).

To the best of my knowledge there are many patents that has referred to Ferrous magnets. The reason that I do not use ferromagnetic material is because it retains it's magnetism during the hysteresis loop and is well known in ferromagnetic materials. When an external magnetic field is applied to a ferrous magnet, the atomic dipoles align themselves with the external field. Even when the external field is removed, part of the alignment will be retained: the material has become magnetized in the electromagnet and piston magnets. The use of more energy or electricity has to be used to overcome the retained magnetism. The magnet(s) constructed with rare earth materials are resistant to retaining the magnetic field during strong magnetism know as the hysteresis loop. The rare earth magnets in combination with electromagnets will consume less electricity.

Of the many patents issued for an electromagnetically or magnetically propelled engines, to the best of my knowledge no electromagnet, electromagnetically or magnetically controlled propelled engines have any kind of magnetic shielding to protect the occupants, people on the outside of the vehicle, engine, or engine compartment from serious bodily harm or death from the strong magnetic fields generated by this type of engine. Shielding of these strong magnetic fields would be to prevent possible interference of pacemakers, other on the person electrical accessory, equipment or items sensitive to strong magnetic fields.

I have invented magnetically propelled engine or power plant components, conversion parts, and other parts that aid in operation of a magnetically propelled engine. The main components consist of one or more strong electro-magnets per piston in the cylinder head. Opposite poles attract each other and like poles repel. My invention utilizes both. It includes a piston that employs magnetic repulsion and attraction of the cylinder head's electro-magnet(s) by having a non ferrous rare earth Samarium Cobalt, Neodymium, Ceramic, Alnico, flexible or any other type of strong magnet attached to the piston, molded by being cast or forged inside the piston, or the entire piston is cast or forged as a magnet piston. The cylinder wall consists of a cylinder sleeve easily installed and removed, that has one or more electro-magnetic coil(s) inside the sleeve, to apply strong magnetic force to the piston in conjunction with engine timing, to apply torque to the crankshaft for driving propose. Increasing the size and power of the cylinder sleeve electromagnet increases the thickness of the cylinder sleeve electromagnet which decreases the diameter of piston so as to maintain piston magnet strength, length has to be added to either the piston magnet or to the magnet piston with the means of a multitude of predetermined electrical current, magnetic fields, magnet, electromagnet, piston, sizes and power ratios. Electrical current is applied to the electro-magnet(s) in the cylinder head and electro-magnetic piston sleeve(s) with electrical connection made through contacts on top of electromagnet cylinder sleeve and in the cylinder head gasket providing direct connection to positive and negative electrical wiring to computer, in time with the motor turning an electronic distributor, distributor advancing mechanism, or computer for increasing and decreasing the engine revolutions per minute. The piston is pushed downward by magnetic repulsion of the cylinder head electro-magnet(s) and attraction of electro-magnet piston sleeve(s) of the piston magnet. Once the piston has made a full downward stroke, the engine timing or computer sends signal to change the electrical current to the opposite polarity going to electro-magnet(s) which causes a hysteresis loop and changes the electromagnet's magnetic field. The cylinder head electro-magnet(s) magnetic field then attracts and the electro-magnet piston sleeve(s) repulsion forces the piston magnet upward, and applies power throughout the entire range of piston travel, in such a manner to apply constant torque to the engine crank shaft. Unlike a standard 4 cycle internal combustion engine that needs 2 full revolutions to create power on one of the two downward strokes. This invention creates power the entire length of a piston stroke on every downward and upward stroke of a piston on every revolution. To achieve maximum efficiency, the use of an internal timing mechanism, electronic distributor, distributors advancing mechanism or computer(s) are used for increasing and decreasing RPMs. Engines with internal camshafts have a solid lifter filler(s) installed for proper flow of oil to the engine and the transportation of oil to the cylinder head for lubrication or cooling. The lifter filler(s) can be changed to a lifter filler switches operated by the camshaft for timing the engine through the use of a computer(s) to operate the electro magnet(s). Switches installed into the cylinder head(s) operated by a factory single overhead camshaft or a dual overhead camshafts to send information of timing position to a computer(s) to power electro magnet(s) in proper firing sequence. With use of a computer and electronic pick-up(s) to sense the position of the engine crankshaft in relation to top dead center, for proper electromagnet(s) firing order. Electronic camshaft position sensors can be used to sequentially fire the electro magnet(s) by computer. Computer control varied timing and power curves can be applied to the electro magnet(s) for maximum power efficiency. Multiple electro magnets can be installed over each cylinder in the cylinder head to have varying magnetic strengths. Strong electromagnets for acceleration of engine revolutions per minute and weaker electromagnets to maintain revolutions per minute at lower power consumption for increase efficiency. To decrease the horsepower consumption and generate electricity to power a magnetically propelled engine use of an electric producing turbine or turbo that runs off of the wasted exhaust air produced from the piston(s) compressing air in an electromagnetic repulsion and attraction engine can be built with a standard electric turbine generator or turbine with a standard alternator with gear reduction for optimum RPM operating range for electric output and ease of maintenance. The comfort of heat to the passenger compartment of a vehicle in colder weather is provided in my invention by a liquid boiler or liquid heater with a circulation pump because a magnetic repulsion engine won't create enough heat quick enough or warm enough to heat the passenger compartment of a vehicle in cold weather. Colder running engines could be used in the creation of new types of engines that include Oil-less engine(s) with no internal oil and with long wearing plastic piston ring(s) or seals like nylon or Teflon. This oil less engine would be almost maintenance free during the engine's lifetime expectancy. In my invention I have included a mounting plate that has standard electrical plug connection that requires no special adapters or wires that mounts inside the standard fuel door of most vehicles to charge on board battery (s) through the use of an installed on-board battery charger or tender. Safety of occupants, people on the outside of the vehicle, engine, or engine compartment must be protected from the magnetic fields generated by this type of engine. Shielding of these magnetic fields would be to prevent possible interference of pacemakers, other on the person electrical accessory, equipment or items sensitive to strong magnetic fields. With the use of one or more of these types of magnetic shielding maximum protection can be achieved. To accomplish the magnetic shielding use of a finely ground powder consisting of iron, copper, chromium, nickel alloy suspended in a spray-able mix of paint, powder-coating or epoxy coating sprayed on the exterior of the engine for isolating magnetic field(s) inside the engine. The electro-plating dip is copper, chromium, nickel alloy for coating an engine block and other metal engine parts to retain magnetic field(s) inside the engine. Cast iron reduces or blocks electromagnetic fields. Cast iron shielding should be utilized in the engine block, oil pan and cylinder head covers. My invention includes an adhesive backed copper, chromium, iron, and nickel alloy foil of varying thickness for retaining magnetic fields inside the engine compartment. This foil is die cut into pieces to stick on the inside of an engine compartment to help further reduce or block the magnetic field(s).

BRIEF DESCRIPTION OF THE DRAWINGS

FIG. 8 is the magnetically propelled hybrid 4 cycle engine showing intake stroke that with a charge of positive and negative electrical power to cylinder head electromagnet with magnetic repulsion of the molded piston rare earth magnet downward thereby drawing air through the standard intake valve allowing filtered air into the cylinder. The compression stroke has a reverse of polarity of electrical charge to the positive and negative terminals to cylinder head electromagnet that causes hysteresis loop and magnetic attraction of the molded rare earth magnet piston upward thereby compressing fuel inside the cylinder. The power stroke ignites the fuel air mix creating combustion at the same time a charge of positive and negative electrical power to cylinder head electromagnet causes again causing hysteresis loop with magnetic repulsion of the molded rare earth magnet piston forcing it downward. The exhaust stroke shows a reverse of polarity of electrical charge to the positive and negative terminals to cylinder head electromagnet that again causes hysteresis loop and magnetic attraction of the molded piston rare earth magnet upward thereby forcing exhaust air out of the cylinder through the standard exhaust valve into the atmosphere. The 4 cycle combustion process and hybrid electromagnet create power the entire length of the up and down rare earth magnet piston stroke.

FIG. 10 is example of multiple electro-magnets of different sizes to control acceleration and maintain speed of a magnetically controlled propelled engine. Larger magnet(s) are used for acceleration and also have larger energy consumption. Smaller electromagnet is used for maintaining engine speed to reduce energy consumption. Any combination of large or small electromagnets can be used for acceleration and maintaining speed. These electromagnets are shown in a sample of a group of electromagnets for placement in a cylinder head.

FIG. 11 is a view of factory installed or aftermarket electromagnet cylinder sleeve(s) that has the engine block bored for exact fit or press in placement into the engine block with electrical connections made through cylinder head gasket to wiring harness directly to a computer for control electromagnet cylinder sleeve(s) while working in time with the cylinder head electromagnet(s).

FIG. 14 is multi-use solid lifter filler that is made to be used as filler for a lifter hole in an engine block to allow for proper oil flow through the engine block or with a switch installed on the bottom of the filler that comes in contact with the engine camshaft lobes for engine timing with an electrical connector in the top of lifter filler.

FIG. 15a is placement of a switch in a cylinder head that is operated by single overhead camshaft lobes to be used to send engine timing signals to a computer which will send positive and negative electrical power to the cylinder head electromagnet to repulsion and attraction to pull the piston upward.

FIG. 15b is placement of switches in a cylinder head that is operated by dual overhead camshaft lobes to be used to send engine timing signals to a computer which will send positive and negative electrical power to the cylinder head electromagnet to repulsion downward and attraction to pull the piston upward.

FIG. 16 is showing use of crankshaft position sensors and timing pick-up rings, on front and rear of engine that give the computer information in regards to the engine position in relation to top dead center to accurately and efficiency control a magnetically controlled propelled engine.

DETAILED DESCRIPTION OF THE INVENTION

Figure 1:
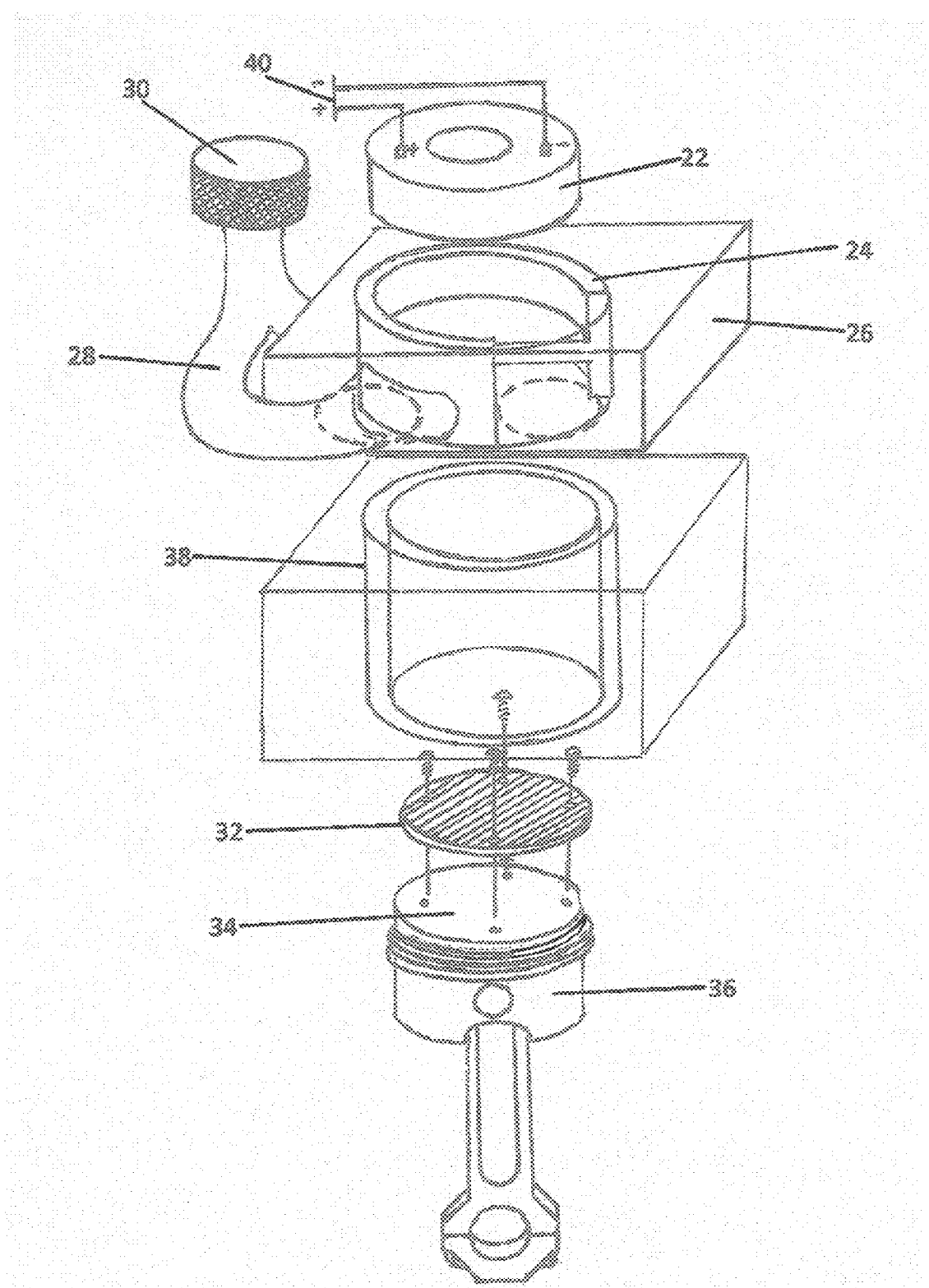
FIG. 1 is an exploded view of a basic engine that would run off of battery power only. The cylinder head has an electromagnet mounted in a magnetic field reducing or blocking material. The combined air intake and exhaust is filtered to keep debris out of the inside of the engine and allows for free flowing air travel with the least resistance on the piston. The piston moves upward and downward inside the electro-magnetic piston sleeve(s), with a repulsive/attractive non ferrous rare earth magnet attached to the piston by the use of screw(s), bolt(s), nut(s) and high strength adhesive.
Figure 4:
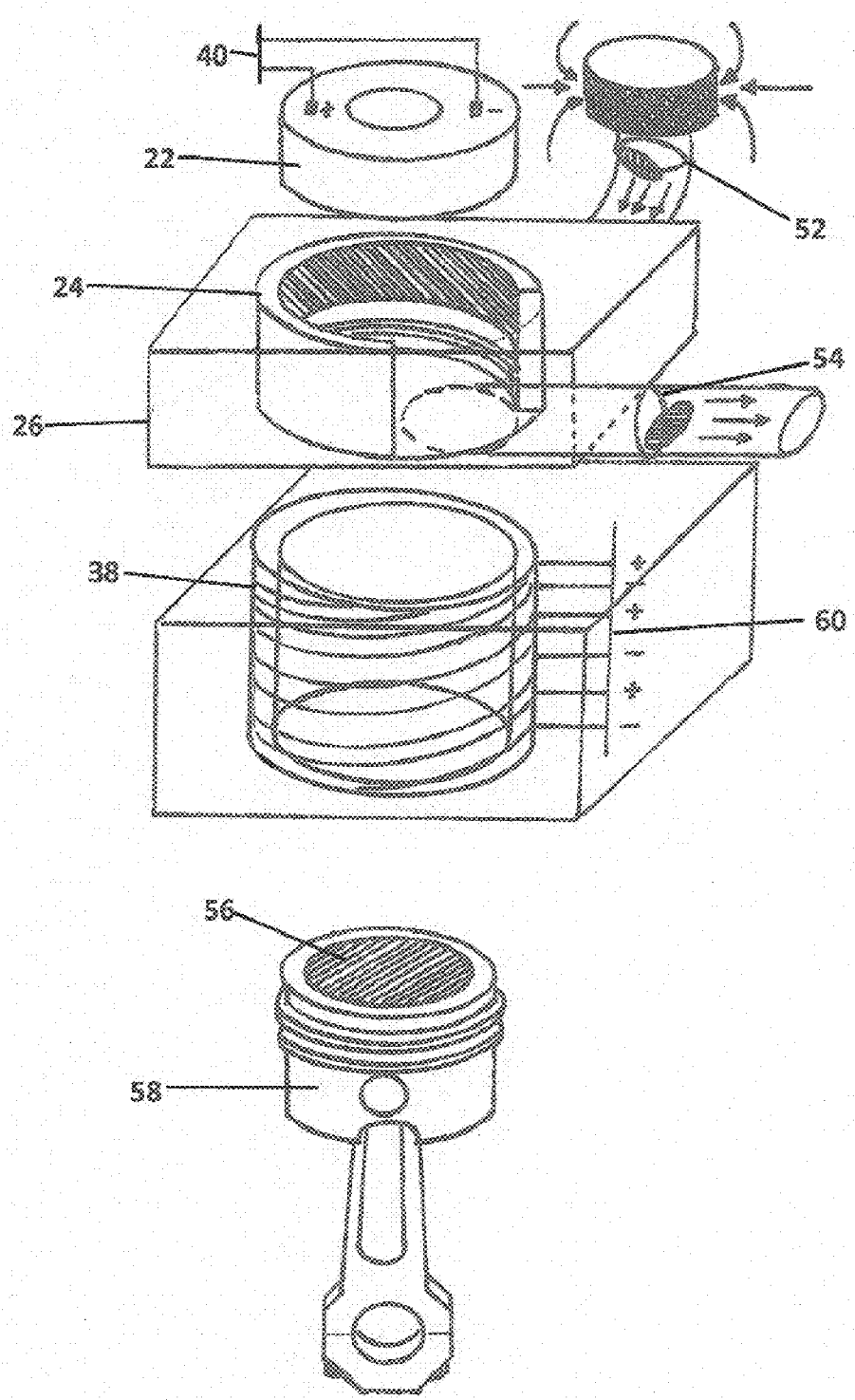
FIG. 4 is an exploded view of a basic engine that would run off of battery power only, that compresses clean air through simple valve(s) or reed valve(s) to force out of engine clean waste exhaust air into a electric generating turbine to create electric to power engine. The intake of air is filtered to keep debris out of the inside out of the engine. The cylinder head has simple one way valve(s) or reed valve(s) for intake of air, compressing clean air out the simple one way exhaust valve or reed valve(s) into the atmosphere. The cylinder head has an electro-magnet(s) mounted in a magnetic field reducing or blocking material. The piston moves upward and downward inside the electromagnetic piston sleeve(s) with electrical connections made through cylinder head gasket to wiring harness directly to computer, with a repulsive/attractive non ferrous magnet molded inside the piston by the way of being cast or forged into the piston.
Figure 7:
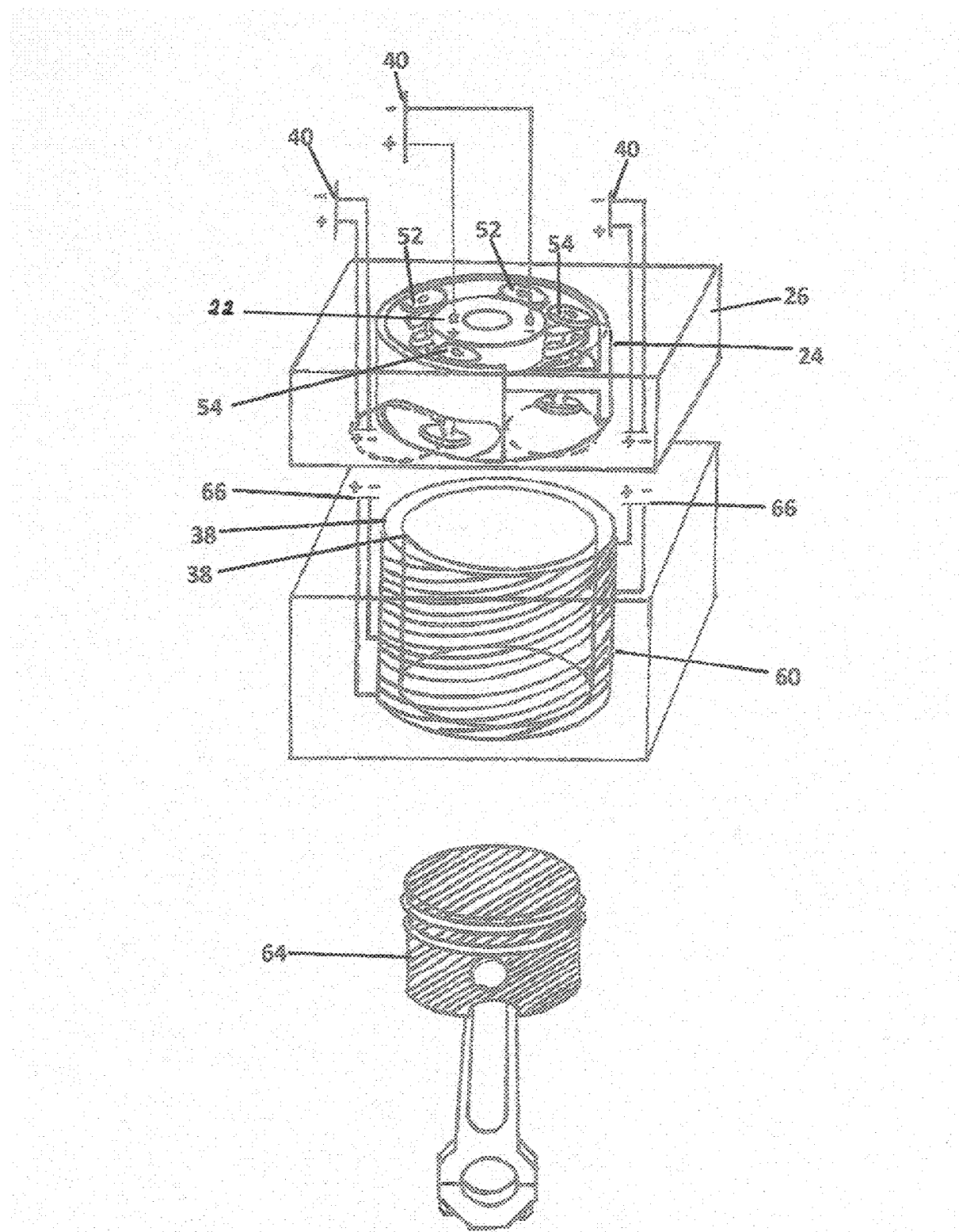
FIG. 7 is an exploded view of a magnetically propelled hybrid engine that would run off of fuel and battery power, which intakes and exhausts air through standard valves for the 4 cycle combustion process. While the electromagnets in the cylinder head in between standard intake and exhaust valves working sequentially with cylinder sleeve electromagnet with electrical connections made through cylinder head gasket to wiring harness directly to computer, to work in conjunction with a computer to run the hybrid power to assist the standard 4 cycle combustion process, it can operate in the place of fuel for acceleration and maintaining speed. This creates power for the entire up and down stroke of the rare earth magnet piston.

Referring now to the drawings in full detail, and in particular to FIGS. 1, 4 and 7, which show a view of all the main magnetically controlled propelled engine parts, showing a full 3 dimensional view of the parts, in an exploded view. The main electro magnet(s) 22 is encased in a magnetic reducing, or blocking material 24 in the cylinder head 26 with the intake/exhaust manifold 28 and intake/exhaust filter 30. The repulsive attractive rare earth magnet Neodymium 32 is used for the engine in this application for it lower working operation temperature and attached with high strength glue, adhesive, screw(s), bolt(s) or any combination of them, to the surface of the piston 34. The piston 36 moves by the electro magnet(s) 22 repulsion and attraction of the rare earth magnet 32 and piston 36 upward and downward, inside the cylinder 38. The movements of these parts are accomplished by applying positive and negative electrical power 40 to the electro magnet(s) 22. The application of positive and negative electrical power 40 and reversal of polarity to the electro magnet (s) moves the rare earth magnet 32 and piston 36 downward and then pulls the repulsive magnet 10 and piston 14 upward.

Figure 2:
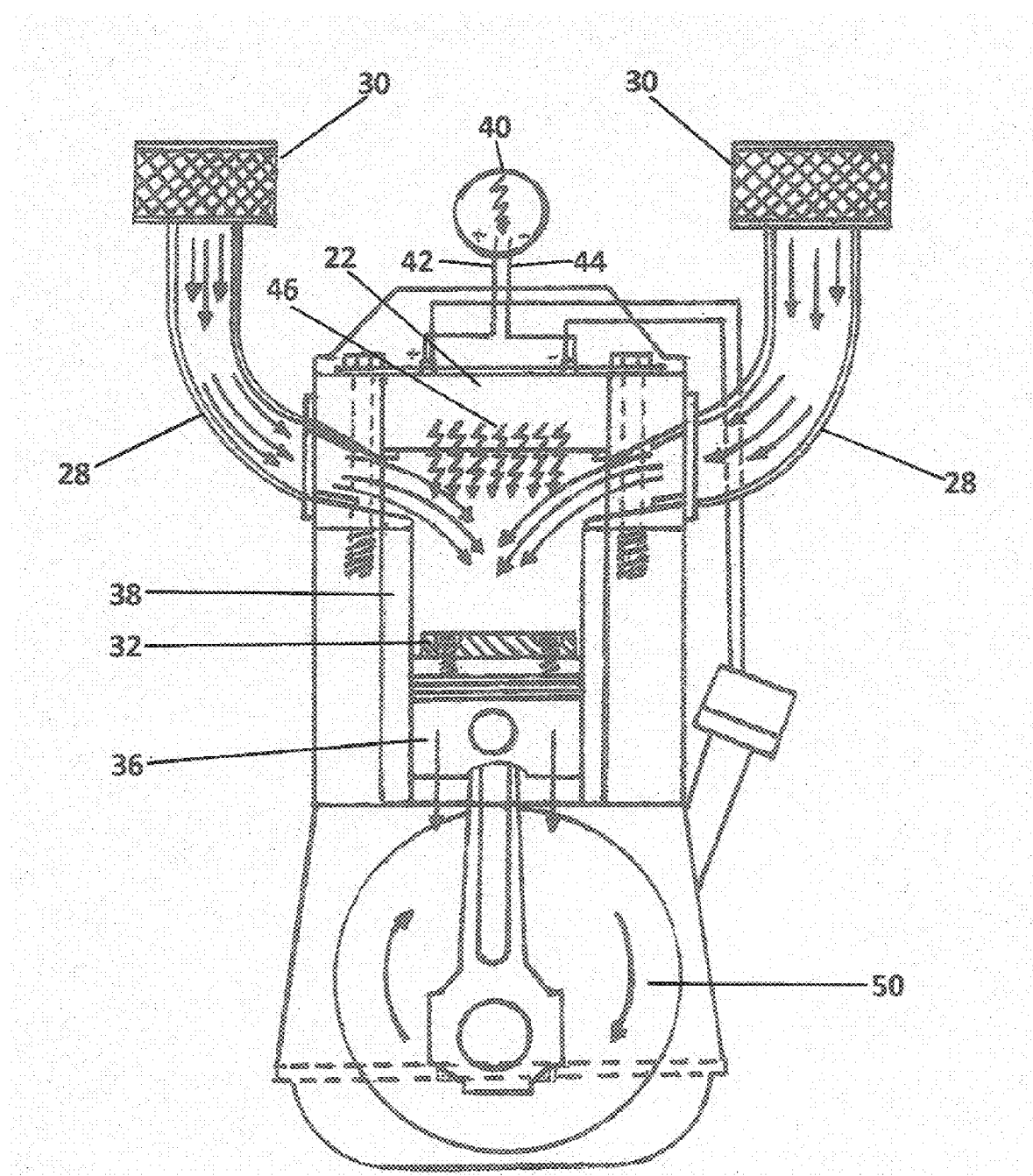
FIG. 2 is a view of engine in FIG. 1 that shows a charge of positive and negative electrical power to cylinder head electromagnet with magnetic repulsion of the piston rare earth magnet downward thereby drawing air through the intake into the cylinder.

The 2 dimensional views provided in FIG. 2 shows the operation of an engine cycle, using power applied to the strong electro magnet(s) 22 by the means of electricity through an electronic pick-up timing device, distributor, distributor advancing mechanism, or a computer 40 by the use of positive 42 and negative 44 power leads. The repulsive magnetic field generated 46 forces the rare earth magnet 32 downward for full piston travel applying power and rotation to the crankshaft, drawing air into the engine through air cleaner 30 and intake 28.

Figure 3:
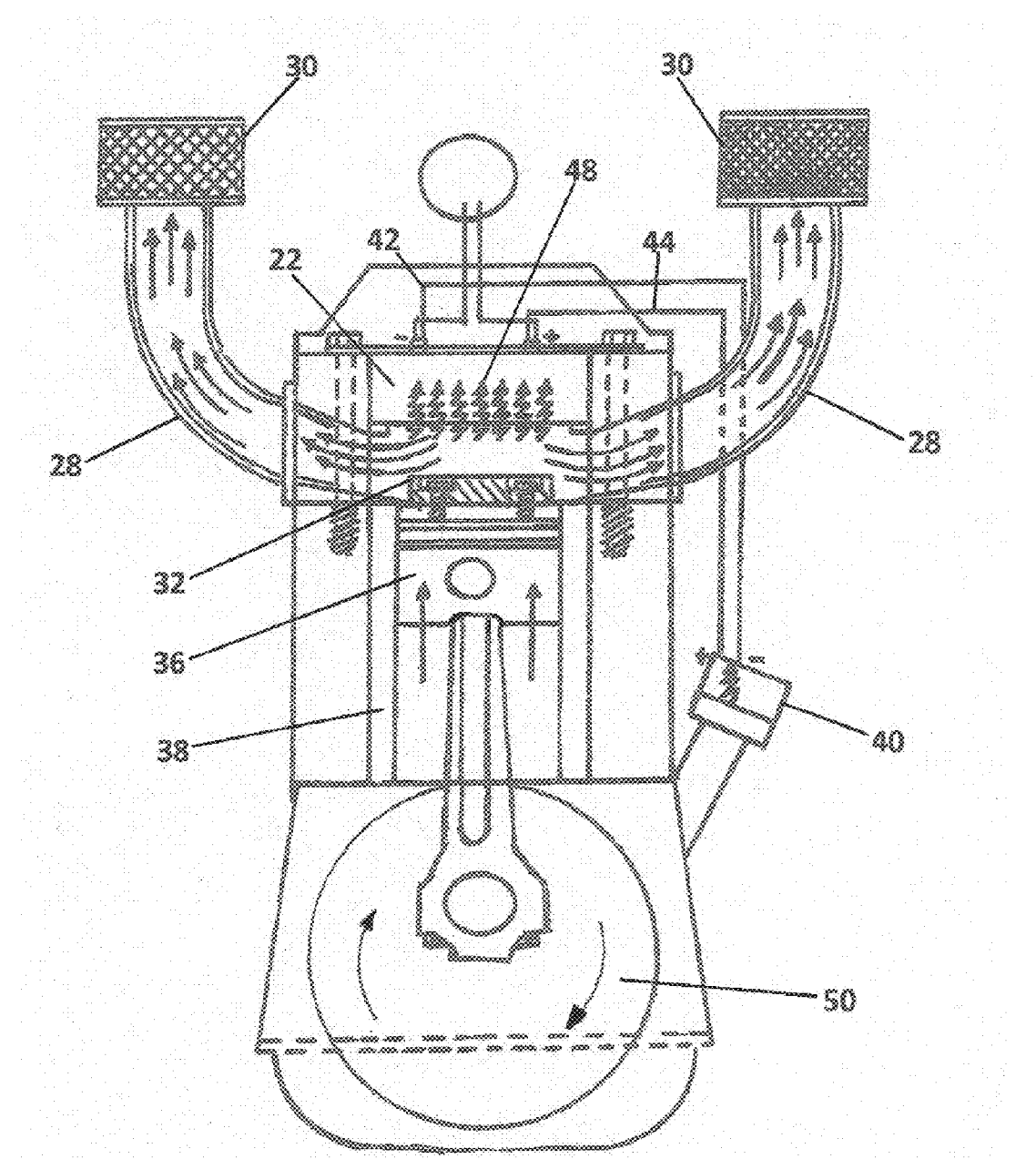
FIG. 3 is a view of engine in FIG. 1 that shows a reverse of polarity of electrical charge to the positive and negative terminals to cylinder head electromagnet that causes hysteresis loop and magnetic attraction of the piston magnet upward thereby forcing clean air out of the cylinder through the intake into the atmosphere.

In FIG. 3 the 2 dimensional drawing shows the $2^{nd}$ part of the engine cycle is reversed by applying reverse polarity through an electronic pick-up timing device, distributor, distributor advancing mechanism, or a computer 40 to the electro magnet(s) 22 and changing to positive 42 and negative 44 electrical leads. Then this reversed electrical polarity changes the repulsive magnetic field 46 to an attractive magnetic field 48 that pulls the rare earth magnet 32 and piston 36 upwards toward the electro magnet, forcing the air out through the intake 28 and air cleaner 30, constantly applying power and rotation to the crankshaft 50.

Figure 5:
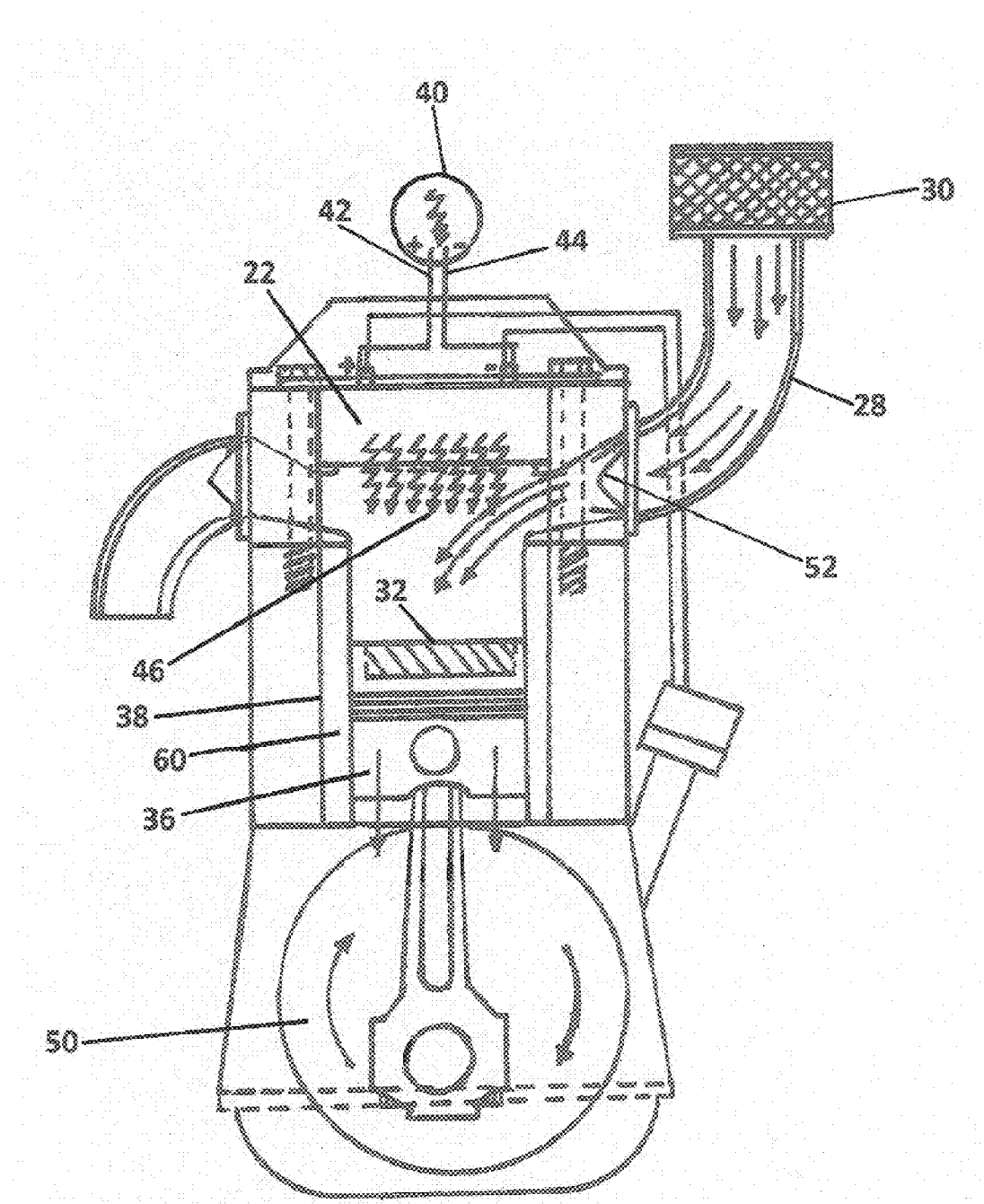
FIG. 5 is a view of engine in FIG. 4 that shows a charge of positive and negative electrical power to cylinder head electromagnet with magnetic repulsion of the molded piston rare earth magnet downward thereby drawing air through the intake opening a simple one way valve(s) or reed valve(s) allowing clean filtered air into the cylinder.

The 3 dimensional drawing of FIG. 4 consists of an electro magnet(s) 22 inside of a magnetic reducing or blocking casing 24 inside of the cylinder head 26 with simple one way intake 52 and exhaust 54 valves or reed valves. The rare earth magnet 56 is constructed or molded by the means of being cast or forged inside of the piston 58. The piston 58 moves by the electro magnet(s) 22 pulling and pushing the rare earth magnet 56 and piston 58 upward and downward inside the cylinder sleeve 38. The cylinder sleeve 38 consists of one or more electro magnet coil(s) 60 that apply electrical current to the coil(s) 60 in sequential timing with the main cylinder head's 26 electro magnet(s) 22. The movements of these parts are accomplished by the means of electricity through an electronic pick-up timing device, distributor, distributor advancing mechanism, or a computer 40 to the electro magnet 22. The application of electrical power 40 and reversal of positive and negative polarity to the electro magnet(s) moves the rare earth magnet 56 and piston 58 downward and then pulls the rare earth magnet 56 and piston 58 upward. The 2 dimensional view provided in FIG. 5 shows the operation of an engine stroke or cycle using power applied to the electro magnet(s) 22 by the means of positive and negative electricity through an electronic pick-up timing device, distributor, distributor advancing mechanism, or a computer 40 by the use of positive 42 and negative 44 power leads. The repulsive magnetic field generated 46 forces the rare earth magnet 32 and piston 36 in conjunction with the cylinder sleeve coil(s) 60 downward for full piston travel, drawing air into the engine through air cleaner 30, intake 28 and simple one way intake valve(s) or reed valves 52.

Figure 6:
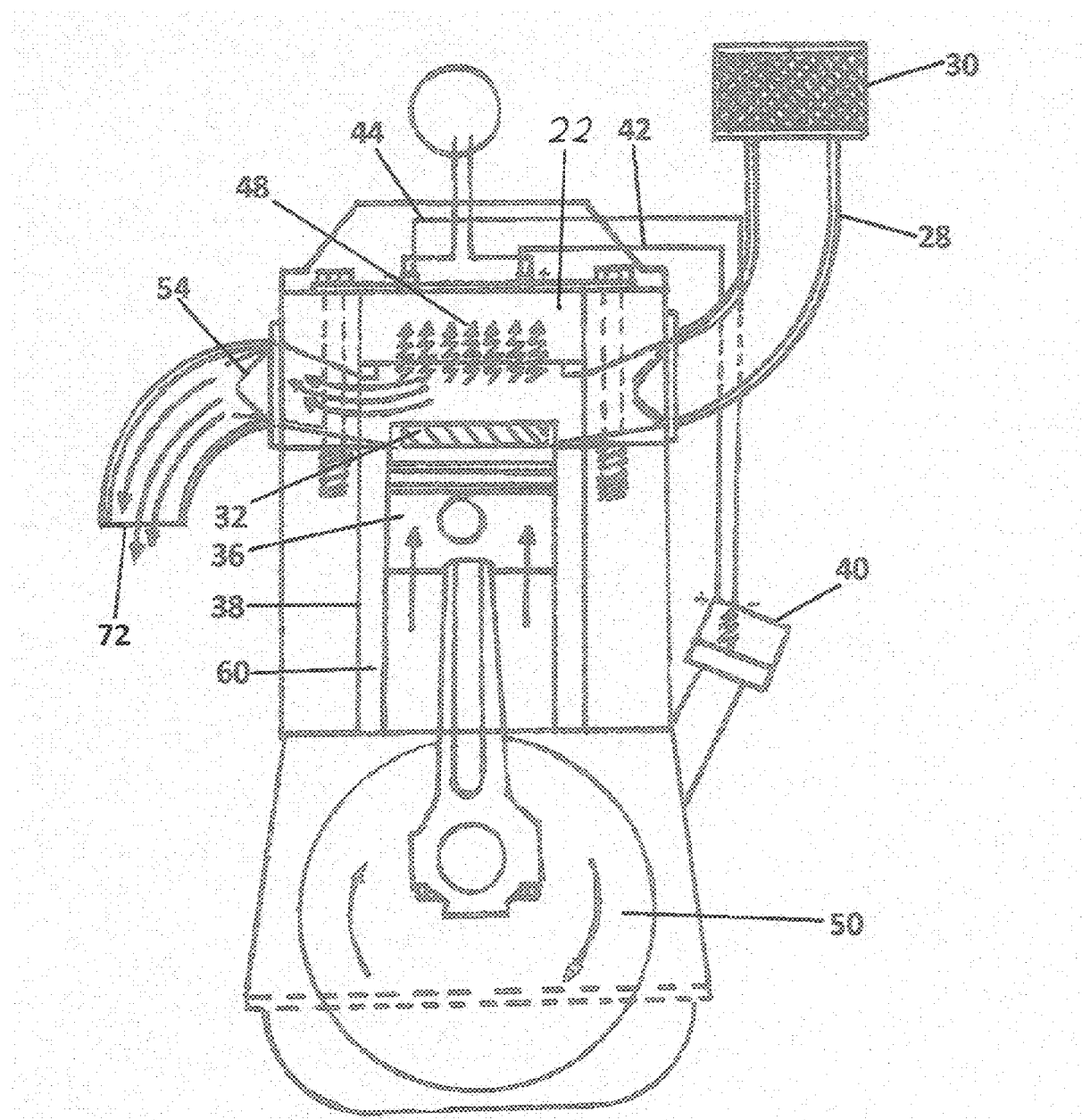
FIG. 6 is a view of engine in FIG. 4 that shows a reverse of polarity of electrical charge to the positive and negative terminals to cylinder head electromagnet that causes hysteresis loop and magnetic attraction of the molded piston rare earth magnet upward thereby forcing clean air out of the cylinder through a simple one way exhaust valve(s) or reed valve(s) into the atmosphere.

FIG. 6 shows the $2^{nd}$ part of the engine cycle reversed by applying reverse of positive and negative electrical polarity through an electronic pick-up timing device, distributor, distributor advancing mechanism, or a computer 40 to the electro magnet 22 and changing to positive 42 and negative 44 electrical leads. Then this reversed electrical polarity changes the repulsive magnetic field 46 to an attractive magnetic field 48 that pulls the rare earth magnet 32 and piston 36 in conjunction with the cylinder sleeve coil(s) 60 upwards toward the electro magnet 22 forcing the air out through the simple one way valve exhaust valve or reed valve 54 and out the exhaust 62, constantly applying power and rotation to the crankshaft 50.

The 3 dimensional drawing of FIG. 7 consists new hybrid 4 cycle internal combustion engine with an electro magnet(s) 22 inside of a magnetic reducing or blocking casing 24 inside of the cylinder head 26 with standard intake 52 and exhaust 54 valve(s). The rare earth magnet Samarium Cobalt or Alnico for their high heat resistance are molded as a piston with construction being forged or cast as the piston 64. The rare earth magnet piston 64 moves by the electro magnet 22 pulling and pushing the rare earth magnet piston 64 upward and downward inside the cylinder sleeve 38. The cylinder sleeve 38 consists of one or more electro magnet coil(s) 60 that can make an electrical connection 66 between the engine block in the mating surfaces of the gasket and of the cylinder head that applies electrical current to the coil(s) 60 in sequential timing with the main cylinder head's 26 electro magnet(s) 22. The movements of these parts are accomplished by applying positive and negative electrical power 40 to the electro magnet(s) 22. The application of positive and negative electrical power 40 to the electro magnet(s) 22 repulsive magnetic field forces the rare earth magnet piston downward and reversal of polarity to the electro magnet(s) 22 attractive field then pulls rare earth magnet piston 64 upward.

In 2 dimensional FIG. 8 shows an example of this new Hybrid electric and magnetic repulsive attractive engine's 4 stroke or cycle operation that consists of the main electro magnet (s) 22 receiving the means of electricity through an electronic pick-up timing device, distributor, distributor advancing mechanism, or a computer 40 by the use of positive 42 and negative 44 power leads. The repulsive magnetic field generated 46 forces the rare earth magnet piston 64 downward for full piston travel, drawing air/fuel mixture 68 into the engine through air cleaner, 30 intake 28 and intake valve 52 on the INTAKE cycle. The COMPRESSION part of the 4 stroke engine cycle is actuated by applying reverse polarity through an electronic pick-up timing device, distributor, distributor advancing mechanism, or a computer 40 to the electro magnet 22 and by a computer electronically switching the positive 42 and negative 44 electrical connections. Then this reversed electrical polarity changes the repulsive magnetic field 46 to an attractive magnetic field 48 that pulls the rare earth magnet piston 64 upwards toward the electro magnet compressing the air/fuel mixture 68. In the POWER STROKE, both the air/fuel mixture 68 is ignited near the end of the compression stroke, usually by a spark plug 70 for gasoline, or by the heat and pressure of compression for diesel, and at the same time electricity through an electronic pick-up timing device, distributor, distributor advancing mechanism, or a computer 40 by the use of positive 42 and negative 44 electrical connections. The repulsive magnetic field generated 46 forces the repulsive magnet piston 64 downward for full rare earth magnetic piston 64 stroke. The EXHAUST is created by electricity through an electronic pick-up timing device, distributor, distributor advancing mechanism, or a computer 40 by the use of positive 42 and negative 44 electrical connections. Then this reversed electrical polarity changes the repulsive magnetic field 46 to an attractive magnetic field 48 that pulls the rare earth magnet piston 64 upwards toward the electro magnet and the rare earth magnetic piston 64 pushes the emissions of combustion 72 from the cylinder through an exhaust valve(s) 54, constantly applying power to the crankshaft 50. The electro magnet(s), cylinder head(s), electro-magnetic cylinder sleeve, electronic timing component(s), repulsive magnet(s), and piston(s) can all be used in any combination. During the intake, compression, power stroke, exhaust, application of the electromagnet magnetic field's repulsion and de-magnetism hysteresis loop in between reversal of polarity with re-energizing electromagnet's attractive field on the rare earth magnet piston retains the least magnetism on the rare earth magnet (s).

Figure 9:
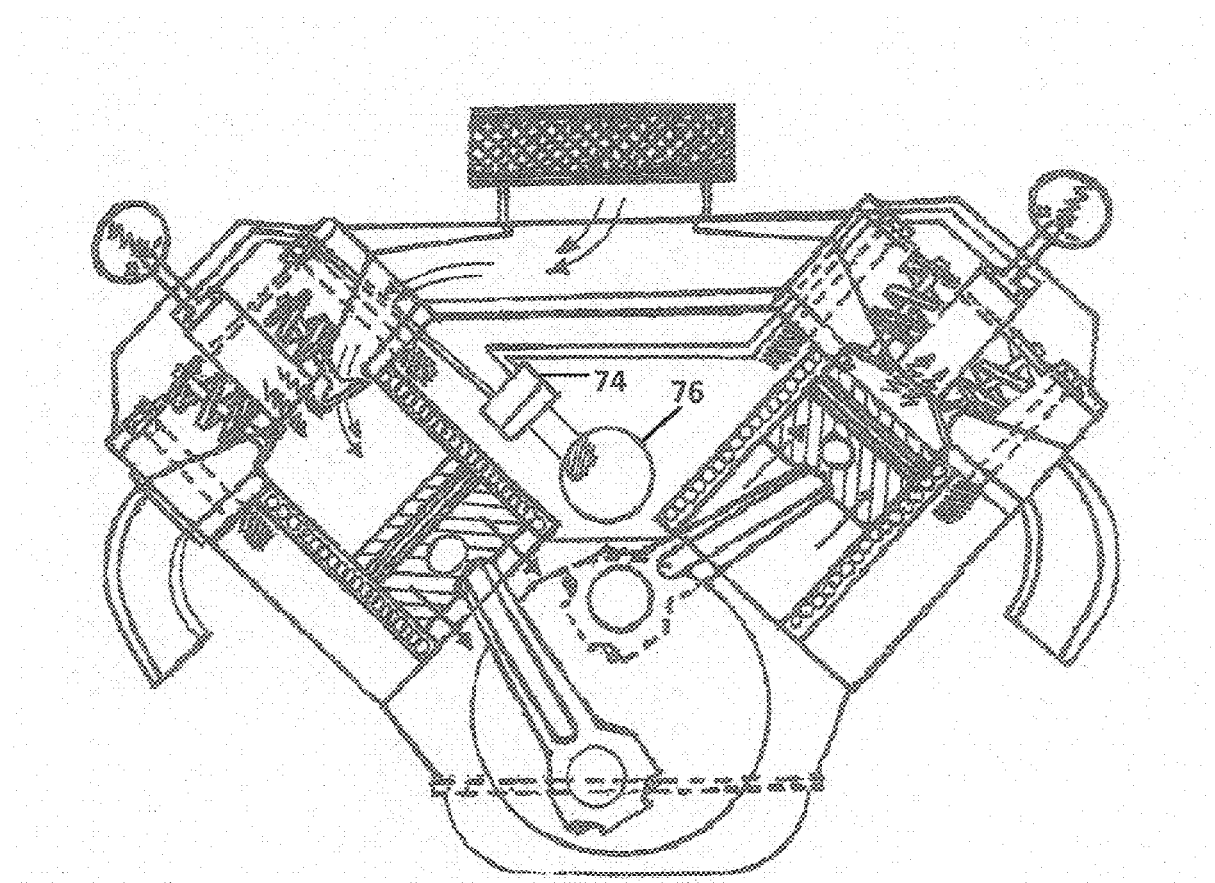
FIG. 9 is of an internal electronic timing device or distributor that can be used in either the basic electromagnet controlled propelled engine or the new hybrid 4 cycle engine(s) and is designed to fit into a camshaft lifter hole, it is turned by a gear on a camshaft it is set in time with the engines timing of Top Dead Center and can work in conjunction with a computer to run the engine.

The 2 dimensional drawing in FIG. 9 shows an internal regulating or electronic pick-up timing device that sends signals to a computer, distributor, distributor advancing mechanism, or a computer 74 that operates off of a gear mechanism driven by the camshaft 76. Keeping the engine in correct timing, and can be used on most engines that have an internal camshaft.

This drawing in FIG. 10 is of multiple electro-magnets 78 in a carrier housing 80 for placement in a cylinder head. The five outside more powerful electro magnets 82 around the core electro magnet 84 are for creation of power and the core electro magnet 84 is for maintaining speed at RPM while shutting off outer electromagnets to conserve electrical power. The outer electro magnets turn back on instantly for power, for acceleration or deceleration to act as an engine brake. Timing on the electro magnets is not only for acceleration of RPM but also retarding of timing can use the electro magnets for braking power to slow an engine, or even to stop an engine.

The placement of the cylinder sleeve in FIG. 11 is a view of cylinder sleeve 38 with electromagnetic coils 60 insertion and placement into an engine block 86. The cylinder sleeve 38 consists of one or more electro magnet coil(s) 60 that can make an electrical connection 66 between the engine block in the mating surfaces of the gasket and of the cylinder head that applies electrical current to the coil(s) 60 in sequential timing with the main cylinder head's 26 electro magnet(s) 22. By designing from new, to be placed inside the engine block 86 or for a conversion of an existing internal combustion engine, by boring the engine block 86 to install a sleeve of appropriate electro magnet coil 60 size and reducing the size of the rare earth piston magnetic 58 for either an all electric electromagnetic repulsive engine, or a hybrid fuel and electromagnetic repulsive engine. A smaller magnetic repulsive piston 58 uses less fuel with larger electromagnetic coils 60 for power in conjunction with the cylinder head 26 electro magnet(s) 22.

Figures 12, 13:
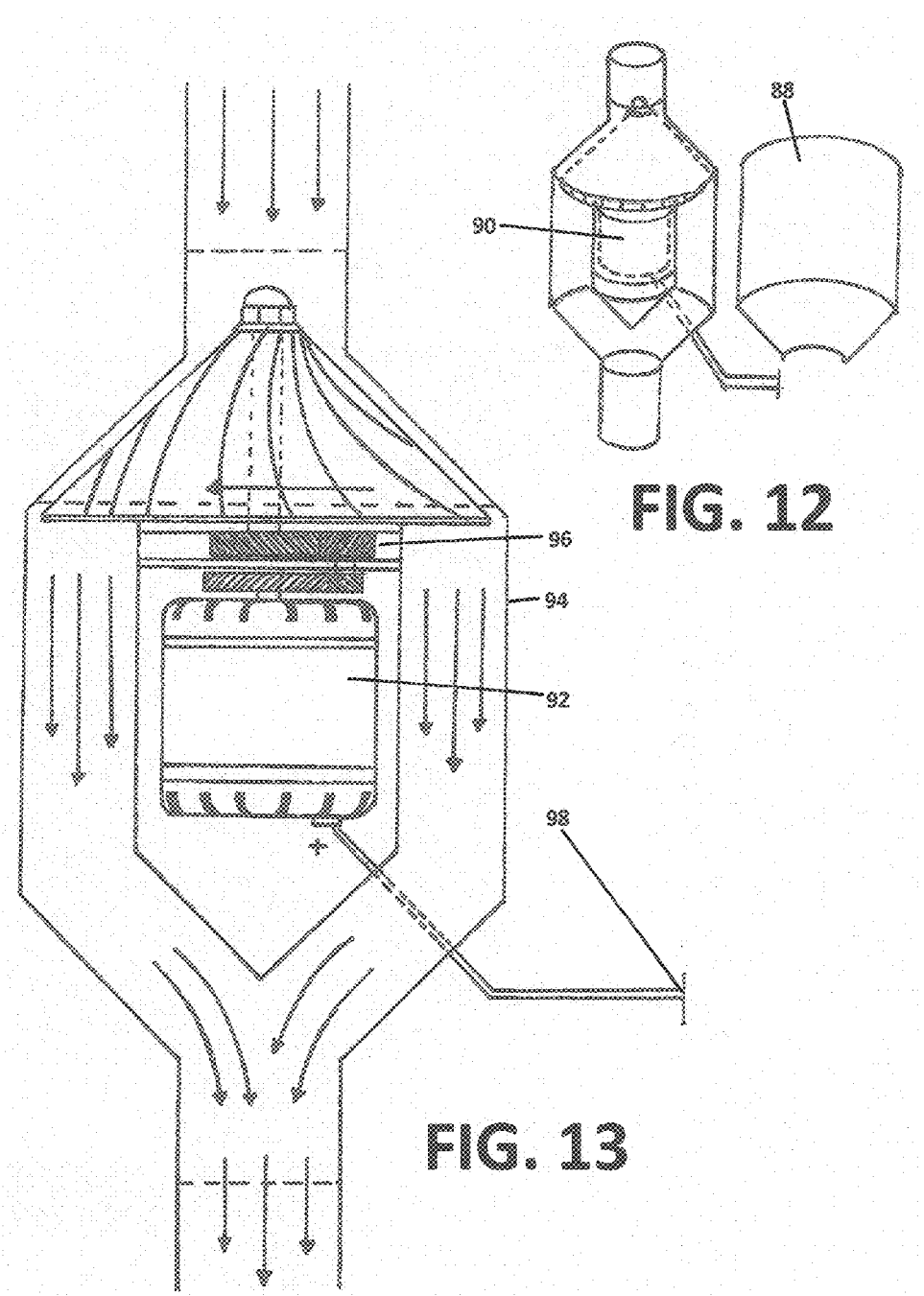
FIG. 12 is a view of an access cover to remove for repair of electrical generating turbine or turbo.
FIG. 13 is an electrical generating turbo or turbine placement in an exhaust pipe inside of a housing, That can use a standard car alternator with gear reduction to operate alternator in optimum range for generating electricity. It uses the air flow in one direction to spin the turbo or turbine to generate electricity.

The access cover 88 in FIG. 12 in this view is for removal, inspection and repair of turbine or alternator 90 and FIG. 13 is an electric turbine or alternator 92 in an exhaust system, with the option of using an alternator in universal turbo housing with gear reduction 96 to spin the alternator at optimum electric producing speeds. The air that is compressed and exhausted out of an electromagnetic repulsive engine or a hybrid fuel and electromagnetic repulsive engine, it uses the air flow in one direction to spin the turbo or turbine for the creation of electrical power 98 to charge battery(s) and power a magnetically controlled propelled engine.

The electrical timing components in FIG. 14 are for a conversion of an internal combustion engine that has a camshaft, lifters and use of a wide ridge on the top circumference 99 of solid lifter 100 shortened so as to not be touched by the camshaft. Oil holes 102 in the solid lifter 100 to allow proper oil flow to the internal components of an engine. A solid threaded plug 104 for the top and bottom of the solid lifter 100. A threaded plug 106 with oil line 108 to the cylinder head for cooling or lubrication. The threaded electronic switch 110 actuated by the camshaft wired to an electronic pick-up timing device, distributor, distributor advancing mechanism, or a computer 40 for powering the timing in electro magnet(s) in the cylinder head 26 electromagnet cylinder sleeve 38.

The example given in FIG. 15A gives placement of a single over head camshaft 112 timing switch 114 placement in relation to electrical wiring 116 and electro magnet 118. The location of timing switch 114 can be in any orientation around camshaft 112 that space and timing of the engine allows.

The example given in FIG. 15B gives placement of a double over head camshaft 120 timing switches 122 placement in relation to electrical wiring 124 and electro magnet 118. The location of timing switch 122 can be in any orientation around camshaft 120 that space and timing of the engine allows.

The engine in FIG. 16 shows the use of two electronic pick-up timing devices on the front of the engine that have two timing rings 128 behind or in front of the harmonic balancer. The timing can also be taken from the rear flywheel electronic pick-up, or timing device 130, the use of camshaft position sensors, electronic pick up timing device(s), distributor, distributor advancing mechanism, signals are fed into a computer 40 to operate a Magnetically Controlled Propelled Engine.

Figure 17:
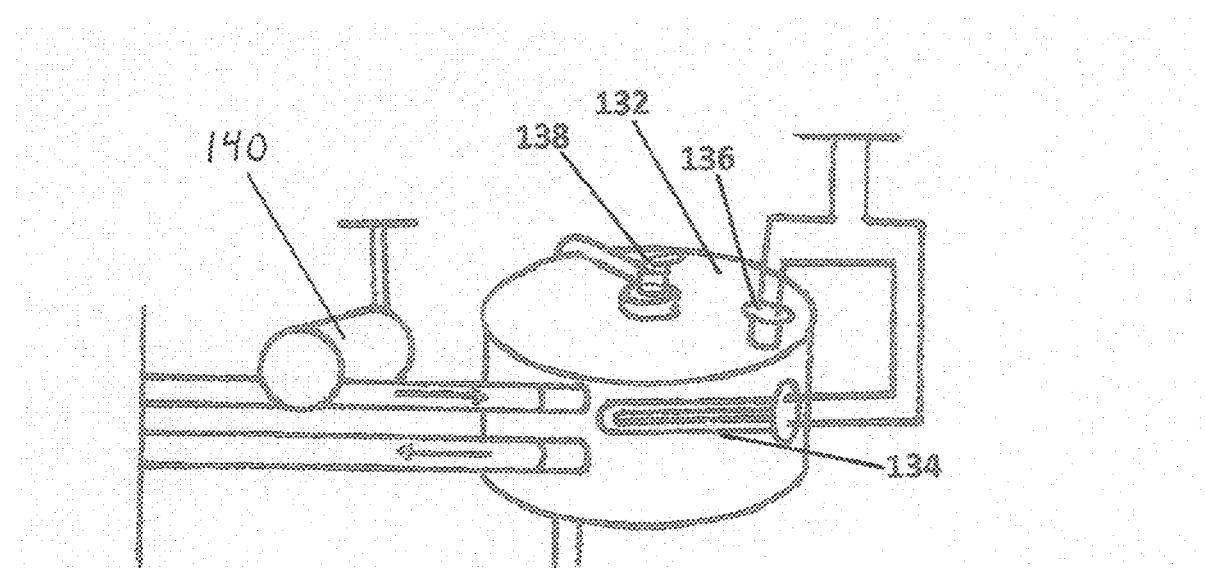
FIG. 17 is a view of a circulation pump that pumps antifreeze through the boiler into the passenger compartment heating system activated by heating system. The boiler contains a heating element to heat the anti-freeze to desired temperature with a temperature shut off switch and pressure relief valve. This produces heat and circulates the heated liquid into the passenger compartment heating system to heat passenger compartment.

Without fuel and flame created during combustion, an engine will run cooler. A magnetically Controlled Propelled Engine will need a type of onboard heat to the passenger compartment of a vehicle. Magnetically Controlled Propelled Engine won't create enough heat quick enough or warm enough to heat the passenger compartment of a vehicle in cold weather FIG. 17 is a view of a circulation pump 140 and a boiler 132 to produce heat for the passenger compartment in a vehicle. The element 134 inside the boiler heats up the antifreeze and a temperature/pressure sender 136 will shut down, when up to temperature or over pressure. If the boiler overheats and boils over, it has a pressure relief valve 138 to release the hot liquid for safety reasons. It has a circulation pump 140 that circulates liquid. When the liquid is up to a warm preset operating temperature, it will heat the passenger compartment.

Figure 18:
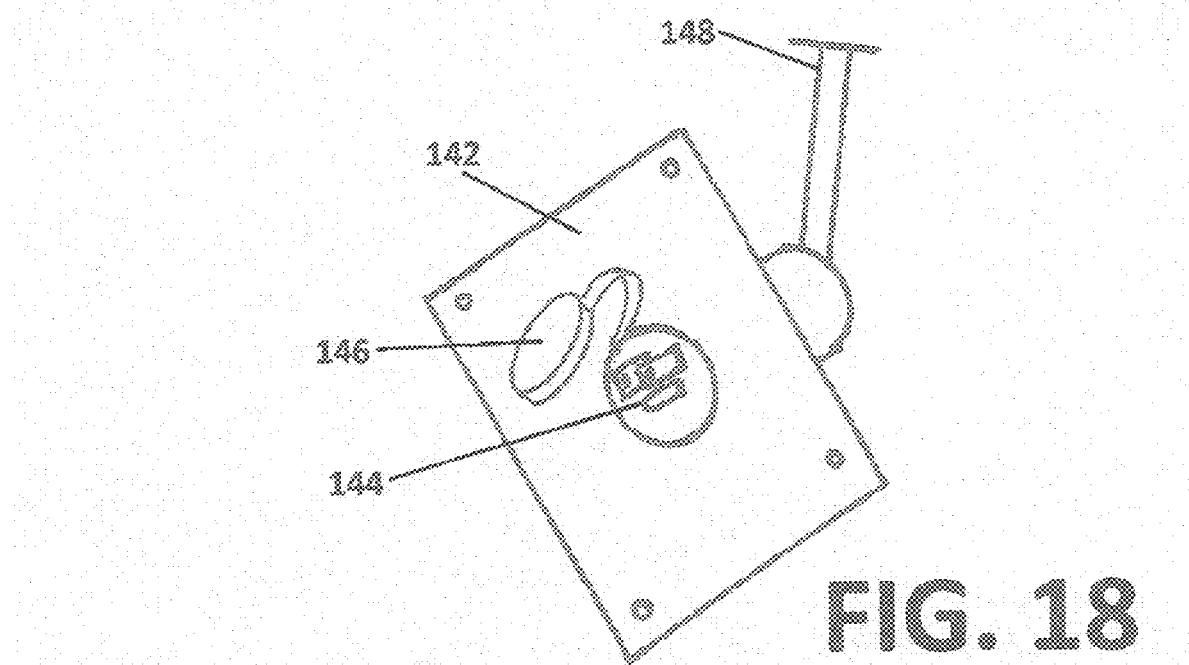
FIG. 18 is a regular electrical plug connection that requires no special adapters or wires that mounts inside the standard fuel door of most vehicles to charge on board battery(s) through the use of an installed on-board battery charger or tender

The mounting plate 142 in FIG. 18 is for a rechargeable connection that mounts inside a fuel filler door that almost every standard internal combustion vehicle has for putting fuel in the fuel tank. The plate 142 would be designed by a manufacturer for new vehicles and retro-fitted for vehicles currently in use. A universal plate 142 would be manufactured with a template for drilling holes, for every vehicle. The mounting plate 142 would have a standard receptacle plug 144 to accept a standard extension cord for charging. With a weather proof cover 146 to keep the electrical contact clean. The wiring 148 to the engine or vehicle would go to an onboard charging system or charging tender, to charge or maintain the onboard battery(s).

Figure 19:
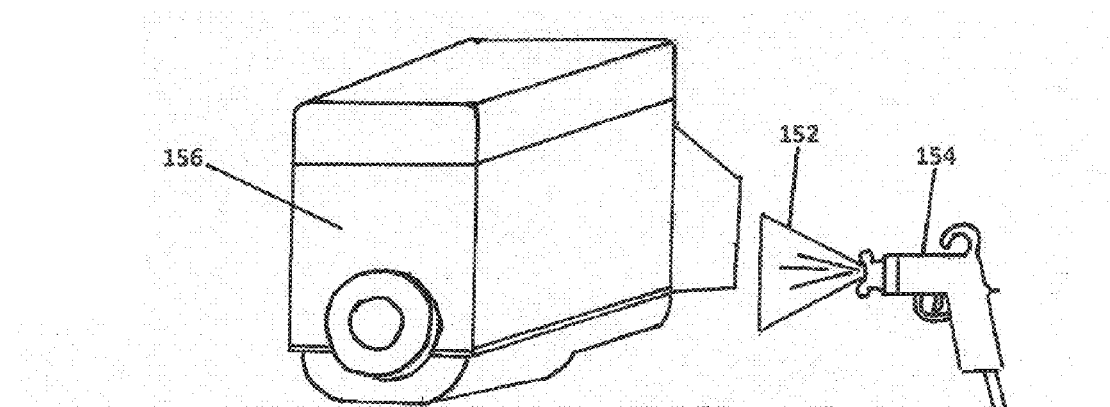
FIG. 19 is magnetic shielding that uses of a finely ground powder consisting of iron, copper, chromium, nickel alloy suspended in a spray-able mix of paint, powder-coating or epoxy coating sprayed on the exterior of the engine for isolating magnetic field(s) inside the engine.

The items in FIG. 19 is for safety magnetic shielding use of a finely ground powder consisting of iron, copper, chromium, nickel alloy suspended in a spray-able mix of paint, powder-coating or epoxy coating sprayed on the exterior of the engine for isolating magnetic field(s) inside the engine. This spray gun mixing pot 150 contains paint, powder-coating, or epoxy mix of a powder consisting of iron, copper, chromium, nickel alloy coating mix sprayed 152 by human hands or robotic spray gun 154 to coat the outside of an engine 156 to isolate the magnetic field(s) inside of the engine.

Figure 20:
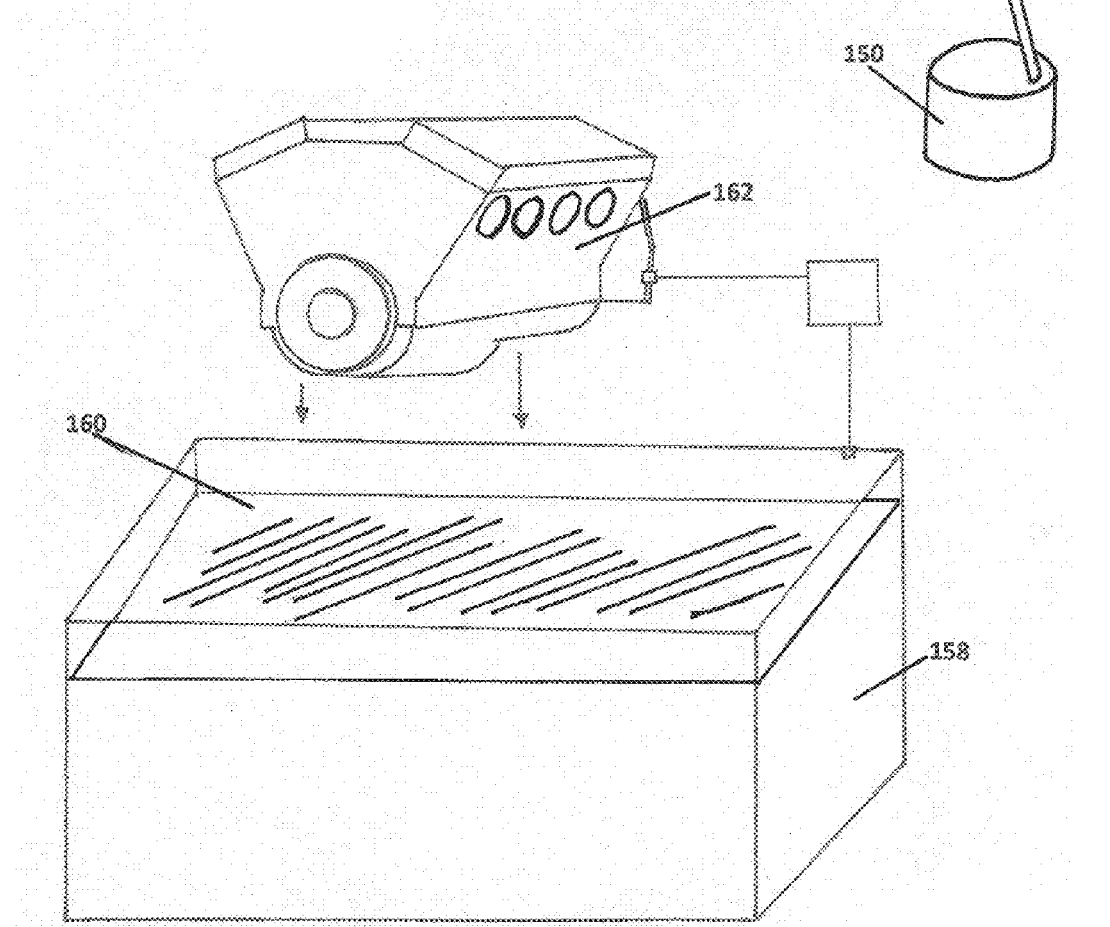
FIG. 20 is copper, chromium, nickel alloy electro plating dip, of an engine block and other metal engine parts to retain magnetic field(s) inside the engine.

The electro plating tank 158 in FIG. 20 is copper, chromium, nickel alloy electro plating dip 160, of engine block 162 and other metal engine parts 162 to retain magnetic field(s) inside the engine. This process should be done before the engine is assembled.

Figure 21:
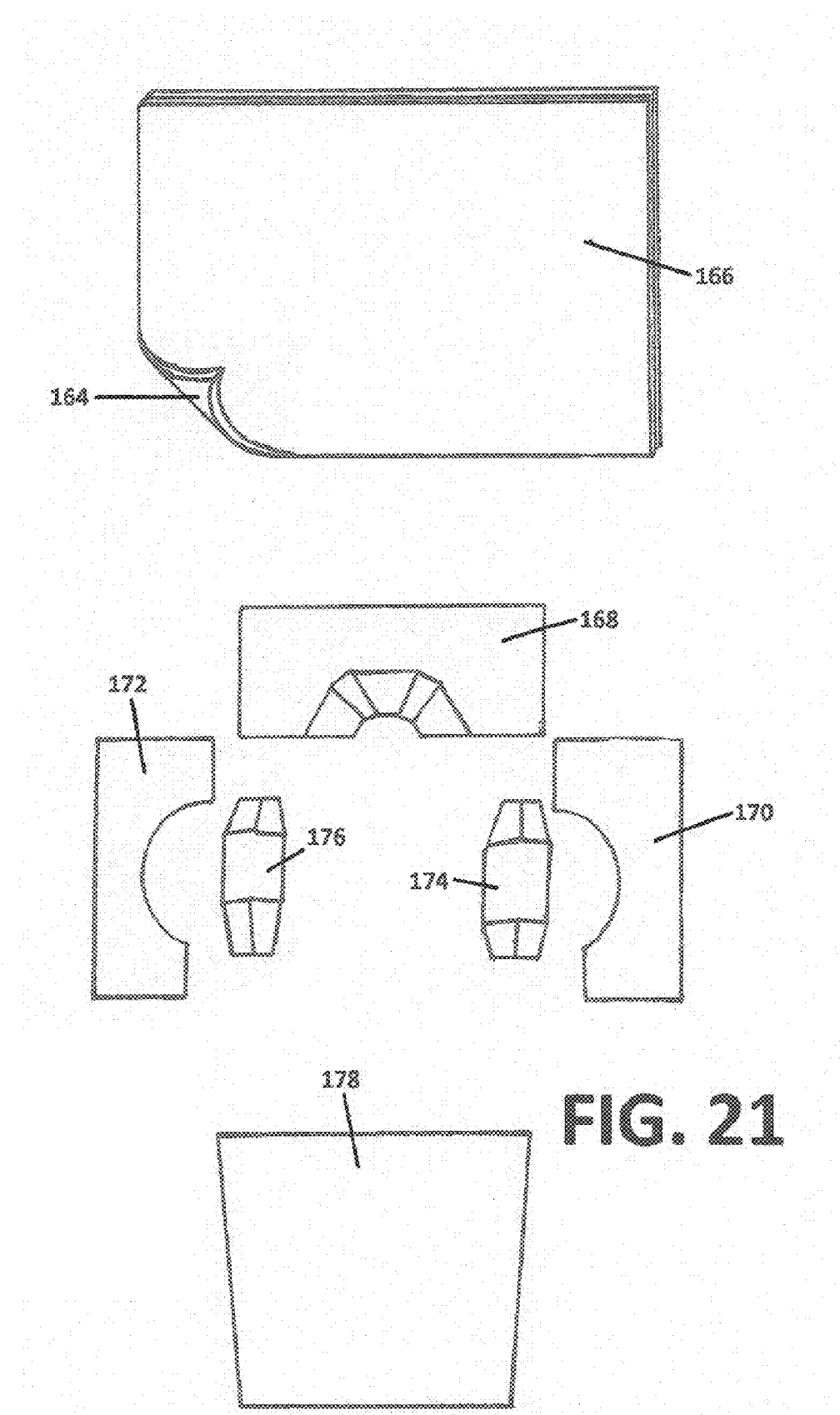
FIG. 21 is an adhesive backed copper, chromium, iron, and nickel alloy foil of varying thickness for retaining magnetic fields inside the engine compartment. This foil is die cut into pieces to stick on the inside of an engine compartment to help further reduce or block the magnetic field(s).

The drawings in FIG. 21 is an adhesive backed 164 copper, chromium, iron, nickel alloy multi layered foil 166, for retaining magnetic fields inside the engine compartment. That can be machine die cut by a manufacturer fit any application for custom fit to for the firewall 168, inside left fender 170, inside right fender 172, inside left wheel well 174, inside right wheel well 176 and underside of hood 178. These die cut adhesive backed pieces can easily be hand pressed or robotically machine placed in an engine compartment.

The invention claimed is:

1. An engine comprising:
   a block having at least one cylinder;
   a piston reciprocally movable in each said cylinder, said piston including permanent magnet material;
   at least one rechargeable battery;
   at least one electromagnet in axial facing relationship with each piston for magnetically interacting with said permanent magnet material to move said piston in at least one power stroke responsive to power supplied by said at least one battery;
   means separate from said at least one electromagnet for permitting gas flow into and out of said cylinder responsive to movement of said piston in said cylinder; and
   an electricity generating turbine in electrical communication with said at least one rechargeable battery, said turbine being rotatable by gas flow out of said at least one cylinder.

2. The engine of claim 1 wherein said permanent magnet material is non-ferrous material.

3. The engine of claim 2 wherein said non-ferrous material comprises rare earth material.

4. The engine of claim 3 wherein said rare earth material is selected from neodymium, samarium cobalt, ceramic and alnico.

5. The engine of claim 1 wherein the at least one power stroke is at least one of a repulsion stroke and an attraction stroke.

6. The engine of claim 1 wherein said piston is formed from said permanent magnet material.

7. The engine of claim 1 wherein said permanent magnet material is carried by said piston.

8. The engine of claim 1 wherein, for each cylinder, said at least one electromagnet encloses said cylinder.

9. The engine of claim 1 wherein said at least one electromagnet comprises a plurality of electromagnets.

10. The engine of claim 9 wherein said plurality of electromagnets include electromagnets of differing power.

11. The engine of claim 1 further comprising means in communication with said at least one battery and said at least one electromagnet for activating said at least one electromagnet to effectuate the at least one power stroke.

12. The engine of claim 11 wherein said means for activating is operable to reverse polarity of power supplied to said at least one electromagnet.

13. The engine of claim 11 wherein said means for activating comprises a computer.

14. The engine of claim 13 further comprising at least one camshaft, wherein said computer is in operable communication with said at least one camshaft.

15. The engine of claim 1 wherein the engine is entirely electric in operation.

16. The engine of claim 1 wherein the engine is a hybrid of electric and internal combustion operation.

17. The engine of claim 16 wherein said means for permitting gas flow into and out of said cylinder comprise at least one intake valve and at least one exhaust valve.

18. The engine of claim 1 wherein said means for permitting gas flow into and out of said cylinder comprise at least one intake valve and at least one exhaust valve.

19. In a vehicle having an engine compartment wherein the engine compartment contains a magnetic field producing engine, the improvement comprising magnetic field reducing means for substantially retaining magnetic fields produced by the engine in the engine compartment, wherein said magnetic field reducing means comprise a magnetic field reducing coating provided on the exterior of at least a block of the engine.

20. The vehicle of claim 19 wherein said magnetic field reducing coating includes iron, copper, chromium and nickel alloy.

21. An engine comprising:
a block having at least one cylinder;
a piston reciprocally movable in each said cylinder, said piston including permanent magnet material;
at least one battery;
at least one electromagnet in axial facing relationship with each piston for magnetically interacting with said permanent magnet material to move said piston in at least one power stroke responsive to power supplied by said at least one battery;
means separate from said at least one electromagnet for permitting gas flow into and out of said cylinder responsive to movement of said piston in said cylinder; and
magnetic field reducing means.

22. The engine of claim 21 further comprising a cylinder head, wherein said at least one electromagnet is seated in said cylinder head, and wherein said magnetic field reducing means is disposed in said cylinder head and substantially surrounds said at least one electromagnet.

23. The engine of claim 21 wherein said magnetic field reducing means comprise a magnetic field reducing coating provided on the exterior of at least said block.

24. The engine of claim 23 wherein said magnetic field reducing coating includes iron, copper, chromium and nickel alloy.

25. The engine of claim 21 wherein said magnetic field reducing means comprise electroplating provided on the exterior of at least said block.

26. The engine of claim 25 wherein said electroplating includes iron, copper, chromium and nickel alloy.

27. The engine of claim 21 further comprising a cylinder sleeve disposed in said at least one cylinder and surrounding said piston, said cylinder sleeve including at least one electromagnet coil operated in sequential timing with said at least one electromagnet.

28. In a vehicle having an engine compartment wherein the engine compartment contains a magnetic field producing engine, the improvement comprising magnetic field reducing means for substantially retaining magnetic fields produced by the engine in the engine compartment, wherein said magnetic field reducing means comprise electroplating provided on the exterior of at least a block of the engine.

29. The vehicle of claim 28 wherein said electroplating includes iron, copper, chromium and nickel alloy.

30. In a vehicle having an engine compartment wherein the engine compartment contains a magnetic field producing engine, the improvement comprising magnetic field reducing means for substantially retaining magnetic fields produced by the engine in the engine compartment, wherein said magnetic field reducing means comprise a foil including iron, copper, chromium and nickel alloy.

31. The vehicle of claim 30 wherein said foil is die cut to fit structure of the engine compartment.

32. The vehicle of claim 30 wherein said foil is adhesive backed.

* * * * *